United States Patent [19]
Hayter et al.

[11] Patent Number: 5,448,559
[45] Date of Patent: Sep. 5, 1995

[54] ATM COMMUNICATION SYSTEM WITH INTERROGATION OF OUTPUT PORT SERVERS FOR AVAILABLE HANDING CAPACITY

[75] Inventors: Andrew T. Hayter, Southampton; Simon P. Davis, Hampshire, both of England; Thomas Worster, Munich; Wolfgang Fischer, Germering, both of Germany

[73] Assignees: Roke Manor Research Limited, Hampshire, England; Siemens Aktiengesellschaft, Munich, Germany

[21] Appl. No.: 235,926

[22] Filed: May 2, 1994

[30] Foreign Application Priority Data

May 7, 1993 [GB] United Kingdom ............... 9309468

[51] Int. Cl.$^6$ ............................................. H04L 12/56
[52] U.S. Cl. ............................... 370/60.1; 370/61; 370/94.2; 370/118
[58] Field of Search .................. 370/13, 17, 60, 60.1, 370/61, 79, 82, 85.7, 85.8, 94.1, 94.2, 95.1, 95.2, 118; 340/825.06, 825.08, 825.54

[56] References Cited

U.S. PATENT DOCUMENTS

| | | | |
|---|---|---|---|
| 5,128,931 | 7/1992 | Yamanaka et al. | 370/60 |
| 5,179,556 | 1/1993 | Turner | 370/94.1 |
| 5,285,445 | 2/1994 | Lehnert et al. | 370/60 |
| 5,291,481 | 3/1994 | Doshi et al. | 370/60.1 |
| 5,303,078 | 4/1994 | Brackett et al. | 370/60.1 |

FOREIGN PATENT DOCUMENTS 0388951 9/1990 European Pat. Off. .
0448073 9/1991 European Pat. Off. .

OTHER PUBLICATIONS

"Token Ring Access Method and Physical Layer Specifications", IEEE 802.5, 1989, pp. 31-39.

*Primary Examiner*—Alpus Hsu
*Attorney, Agent, or Firm*—Hill, Steadman & Simpson

[57] ABSTRACT

An ATM communication system has an ATM switch having a plurality of input ports and a plurality of output ports, each of the input ports being fed from an input port server and each of the output ports being arranged to feed an output port server. The input port servers each have a plurality of buffer stores, one for each of the output ports to which output port data is transmitted through the switch. Each buffer store in the input port servers is arranged to interrogate the output port server with which it communicates by a bandwidth request before the transmission of data. This determines whether output port server data handling capacity is available, whereby ATM switch operation during periods of peak traffic is facilitated. The system includes a queuing arrangement for bandwidth requests received during periods when there is no available bandwidth capacity, the arrangement being such that requests are released in a predetermined order when capacity becomes available.

20 Claims, 2 Drawing Sheets

ATM COMMUNICATION SYSTEM WITH INTERROGATION OF OUTPUT PORT SERVERS FOR AVAILABLE HANDING CAPACITY

BACKGROUND OF THE INVENTION

The present invention relates to asynchronous transfer mode (ATM) communication systems. More especially the present invention relates to an apparatus that facilitate ATM switch operation during, periods of peak data traffic, and to the problem of efficiently allocating bandwidth resources in a situation where a multiplexed stream of ATM cells are to be individually switched to different ports.

This problem has been addressed and discussed in Great Britain patent application GB9212447.8.

ATM data traffic is predominantly burst type data traffic. By its nature, burst traffic requires high bandwidths for a part of the time and little or no bandwidth for the rest of the time. In order to efficiently use available bandwidth it is necessary to allocate the bandwidth using the mean bandwidth requirement of each data source and not the peak bandwidth. It will be appreciated that if mean bandwidth allocation is used, the total peak bandwidth may thus be greater than the bandwidth available. Thus in operation of an ATM switch, a problem occurs when a number of data sources burst at the same time causing a peak overload condition to occur inside an ATM switch/multiplexer. If not controlled or limited, this condition will cause data overflow in one or more of the switch/multiplexer internal data buffers, and will result in lost data.

Data destined for a particular output port will enter a switch from many different input ports. The total instantaneous data rate across a switch may be greater than an output port can sustain, and therefore buffering is required. However, even with the provision of buffering, eventual loss of data due to buffer overflow may occur. To reduce this probability to an operationally acceptable level by simply increasing peak capability, results in a low utilization of the switch for much of the time, which is clearly unacceptable. A dynamic bandwidth allocation protocol, as described hereafter, provides a method of allocating bandwidth by sending requests for bandwidth to a designated output port and sending data thereafter only when bandwidth has been allocated as indicated by a return acknowledgement message.

In ATM systems request messages for increases in bandwidth are sent by an input port server to an output port bandwidth allocation mechanism for initial processing. When a switch is heavily loaded, bandwidth is only available from an output port when a bandwidth cleardown message arrives which serves to release some bandwidth. Therefore, bandwidth request messages will always be rejected until after a cleardown. Under these circumstances the first request to be received after a cleardown will be allocated the recently cleared down bandwidth. This is clearly unfair to request messages which may have been rejected just before the bandwidth cleardown message arrived. Requests rejected by an output port are re-sent after a suitable backoff delay. This may lead to unacceptable delays and perhaps to periods during, backoff delays when there is bandwidth.

SUMMARY OF THE INVENTION

It is an object of the present invention to provide for ATM switch operation during periods of peak data traffic so that data is not lost.

It is a further object of the present invention to provide a system wherein this problem is substantially eliminated.

According to the present invention an ATM communication system has an ATM switch having a plurality of input ports and a plurality of output ports. Each of the input ports are fed from an input port server and each of the output ports are arranged to feed an output port server. The input port servers each have a plurality of buffer stores, one for each of the output ports, to which the output ports data is transmitted through the switch. Each buffer store in the input port servers is arranged to interrogate the output port server with which it communicates before the transmission of data. This determines whether output port server data handling capacity is available, whereby ATM switch operation during periods of peak data traffic is facilitated.

The interrogation may take the form of a bandwidth request signal from an input port server in respect of an associated buffer store, the request signal being directed to an output port server with which that buffer store communicates via the switch, and an acknowledgement signal from this output port server in the presence of available capacity in response to which acknowledgement signal data is thereafter transmitted from the buffer store to the output port via the switch.

It will be appreciated that by the expedient of providing in each input port server a buffer store for each output port server and by ensuring that no transmission takes place across the switch if output port server capacity is not available to accept it, data loss through output port server overload is obviated. Thus ATM operation during peaks of data traffic without loss of data is facilitated. ATM data traffic is transmitted in frames, wherein each frame comprises a plurality of cells, with an end of frame marking being transmitted in the final cell of each frame.

In one embodiment of the present invention the request signal is sent in the first cell of each frame, that is, a cell following a cell which includes an end of frame marker. In this case the request cell may be arranged to request a bandwidth allotment which is based on mean frame size, that is the mean data capacity of a frame.

According to an alternative embodiment of the present invention the request signal may be sent in dependence upon the data stored from time to time in a buffer store. In accordance with this alternative embodiment of the present invention each buffer store may embody a plurality of data thresholds, request signals being transmitted in accordance with the threshold reached. Thus the bandwidth request can be tailored according to the quantity of data to be transmitted.

According to a further embodiment of the present invention, an ATM communication system includes a queuing arrangement for bandwidth requests received during periods when there is no available bandwidth capacity, the arrangement being such that requests are released in a predetermined order when capacity becomes available. The order of release may be, simply first to arrive, first to be processed.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several figures of which like reference numerals identify like elements, and in which:

DESCRIPTION OF THE PREFERRED EMBODIMENT

Figure 1:
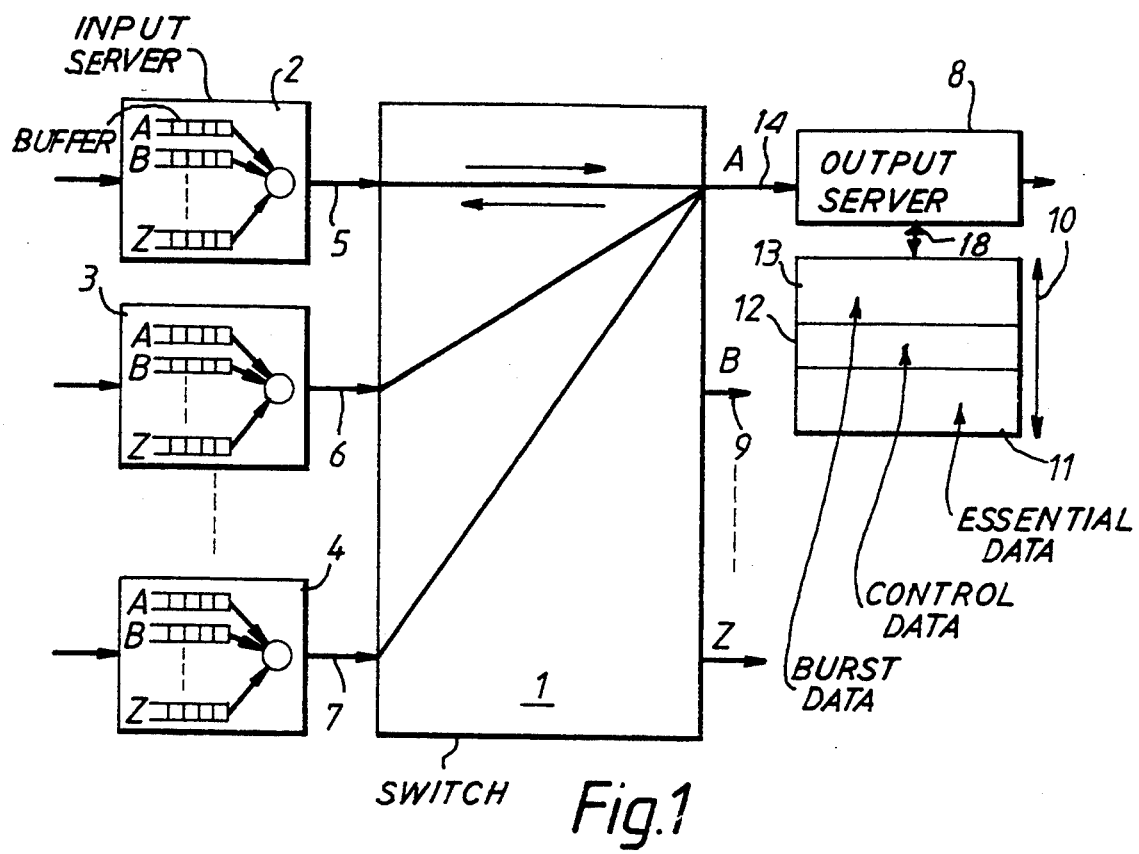
FIG. 1 is a schematic block diagram of a switch having associated with it input port servers and output port servers.

Referring now to FIG. 1, an ATM communication system has a switch 1 which is fed from servers 2, 3 and 4 via input lines 5, 6 and 7 respectively. The input port servers 2, 3 and 4 are arranged to feed a plurality of output port servers one only of which, bearing, the reference numeral 8 is shown. It will be appreciated that in practice a large number of input port servers may be provided and by the same token a very large number of output port servers will be provided which are placed in communication with the input port servers via the switch 1. In the present arrangement each input port server is provided with a plurality of buffer stores A, B . . . Z, one for each of the output servers such as the output port server 8. Thus it will be apparent that signals in the input port buffers A of the input port servers 2, 3 and 4 will be routed via the switch 1 to the output port server 8. Similarly signals in the buffers B of the input port servers 2, 3 and 4 will be routed to the line 9 for a corresponding output port server not shown. Thus with this arrangement it will be appreciated that if the servers 2, 3 and 4 each demand access to the output port server A, an overload condition can occur which may mean that data is lost.

In order to avoid this situation it is arranged that before data is transmitted a request is transmitted which must be appropriately acknowledged. Thus in one specific case if data is to be transmitted from buffer store A in the input server 2 to the output port server 8, a request transmission is made from the input port server 2 to the output port server 8 and if there is available data capacity then an acknowledgement signal is transmitted from the output port server 8 to input port server 2 indicating that data can be transferred therebetween.

As shown schematically in FIG. 1, a total output port bandwidth may be available as indicated by the arrow 10 comprising an isochronous portion of storage 11 for essential data which must be transmitted without undue delay, a control data storage portion 12 for control data and a further storage portion 13 for burst data. Thus, provided space is available in the output port server 8 in an appropriate one of the storage portions 11, 12 or 13, a positive acknowledgement will be sent across the switch 1 which will result in subsequent data transfer.

Figure 2:
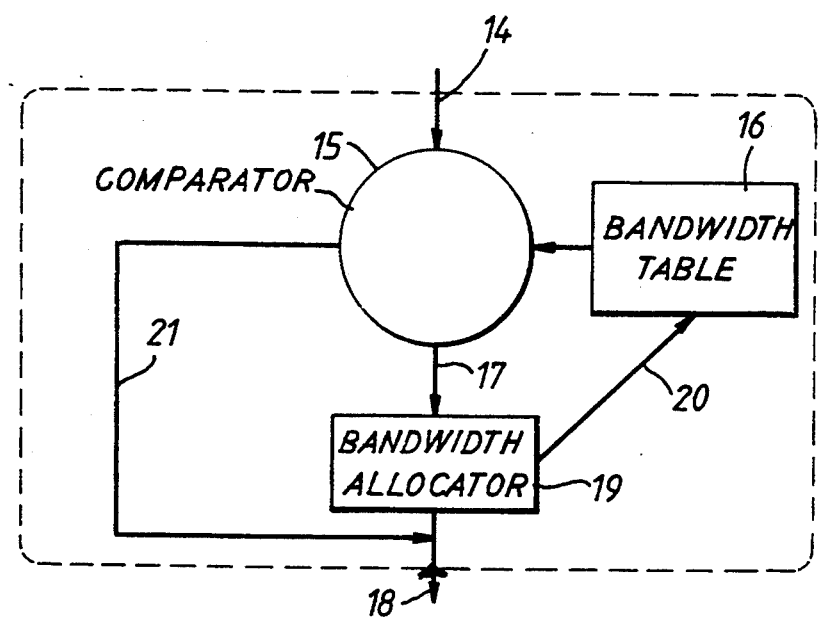
FIG. 2 is a block diagram depicting a bandwidth allocation mechanism.

The mechanism for handling a bandwidth request is shown in FIG. 2 and, upon receipt of a bandwidth request on a line 14, a comparison is made in a comparator 15 with the available bandwidth as stored in a bandwidth allocation table 16 that is representative of storage portions 11, 12 and 13. If sufficient bandwidth is available, a signal is sent via a line 17 to provide a positive acknowledgement on a line 18 from a bandwidth allocator 19 which also provides a feedback signal via a line 20 to update the bandwidth allocation table 16. If sufficient bandwidth is available to meet the request on the line 14, a signal is sent via a line 21 which rejects the request and a negative acknowledgement signal is provided via the line 18.

The amount of bandwidth requested may be determined in dependence upon the anticipated mean frame size. Each frame normally comprises a number of cells, each cell having a predetermined quantity of data contained therein. In one arrangement the last cell of each frame includes an end of frame marker and, upon transmission of the next consecutive cell following an end of frame marker, a bandwidth request is made corresponding to the mean frame bandwidth.

Figure 3:
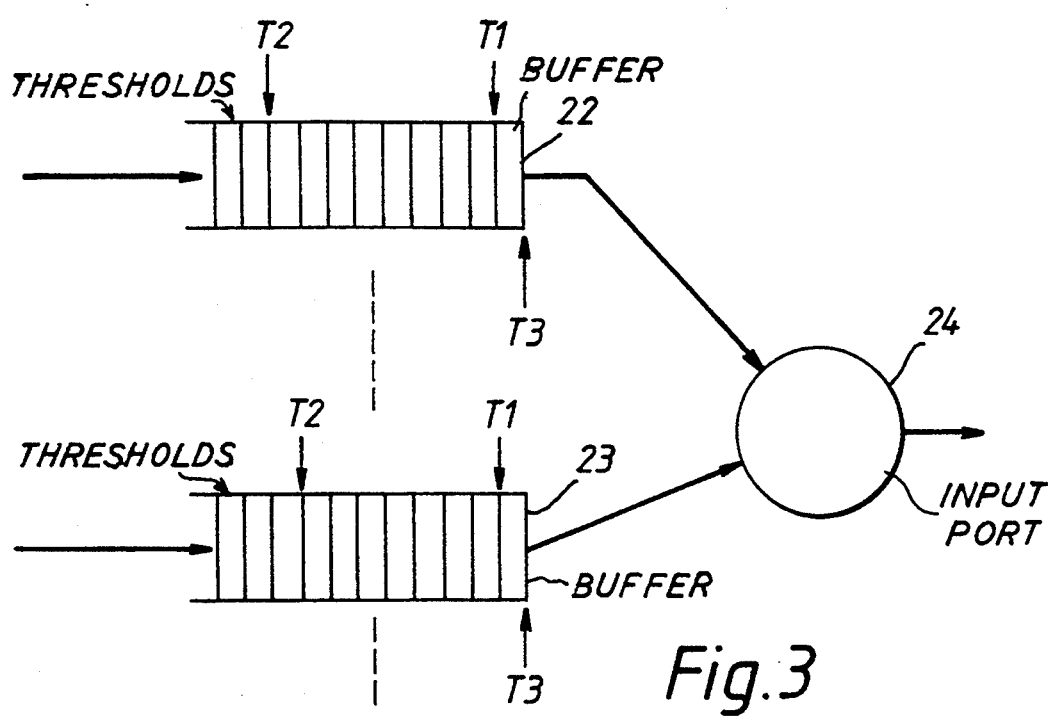
FIG. 3 is a block schematic diagram of buffer stores embodying a plurality of thresholds.

In an alternative embodiment of the present invention, as shown in FIG. 3, each buffer such as buffers 22 and 23 of an input port server which is arranged to communicate with an input port 24 has three thresholds T1, T2 and T3. In operation of the system a bandwidth request is arranged to be transmitted as each threshold is reached, but as will be appreciated the bandwidth requested will be determined by the quantity of data to be transmitted and thus bandwidth will not be reserved unnecessarily.

In arrangements as described above a dynamic bandwidth allocation protocol will operate between an input port server and another server on a desired switch output port. The server on the output port maintains, in effect, a table containing data relating to the current bandwidth reserved for that output. When an input port server requires to send a burst, it thus first sends a reservation across the switch network to the output port server. The reservation cell contains the requested bandwidth. If the output port server can accept the requested bandwidth, a positive acknowledgement cell is sent back to the requested input port server. At this point the data burst can be sent from the input port to the output port. The bandwidth is de-allocated on completion of the burst transmission by means of an explicit clear down signal. The system as described above, in effect, comprises a dynamic reservation protocol wherein only one multiplexing point is involved. Thus coupled with the data service tolerance to delays of 10's of milliseconds and the fact that requests could be queued if blocking occurs rather than re-sent, a very large burst blocking probability (BPP) of 0.9 of higher could be used, and this would also increase performance for a high burst peak bit rate data service.

Figure 4:
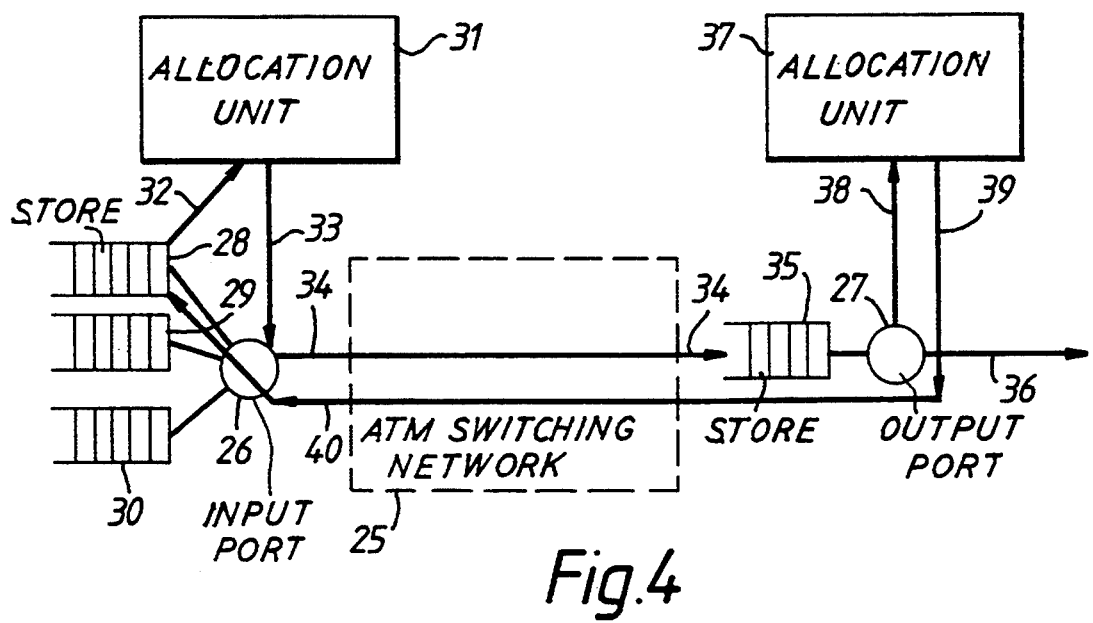
FIG. 4 is a schematic block diagram of part of an ATM communication system in accordance with a further embodiment of the present invention.

Referring, now to FIG. 4, the part of the ATM system under consideration comprises an ATM switching network 25 which is arranged in communication with an input port 26 and an output port 27. It will of course be appreciated that although only one input port and one output port are shown, there will be a plurality of input ports and a plurality of output ports. Data is fed to the input port 26 from a number of different sources which are arranged to feed stores 28, 29 and 30, one store for each source. Although only three stores 28, 29 and 30 are shown in the drawing it will be appreciated that many more sources may be arranged to communicate with the port 26 each via a separate store. Data fed to the stores 28, 29 and 30 is obviously transmitted in the form of ATM cells which may include control signals as well as data. It will appreciated that since there is a maximum available bandwidth in the communication link between the input port 26 and the output port 27 across the switching network 25, a situation can arise where if a large number of stores such as the stores 28, 29 and 30 require access, the available bandwidth may be exceeded. Accordingly, an input port resource allocation unit 31 is provided which checks the current use of the available bandwidth by the sources appertaining, to the stores 28, 29 and 30, and assesses bandwidth requests received from the store as is illustrated schematically by an arrow 32. The requests received may be modified in accordance with bandwidth available and thus a request from the store 28 for a predetermined bandwidth may be modified in the input resource allocation unit 31 and the modified request will be passed via a line 33 to the input port 26 for onward transmission via the switching network 25 on a line 34 which is a schematic illustration of the route. The route through the switch will be occupied by bandwidth requests and data.

Bandwidth requests are fed via the line 34 to a queuing store arrangement 35 whereas data will by-pass the queuing, arrangement and pass through the system and out of the output port 27 on a line 36. Bandwidth available at the output port 27 is assessed by an output port resource allocation unit 37 which monitors the bandwidth currently used by the output port via a line 38 and provides acknowledgement signals via a line 39 which are returned through the switching network 25 and a line 40 to the source making a request. Thus in the present example, if the store 28 makes a request over the line 32 the input port resource allocation unit may modify this request which is passed through the switching network via the line 34 and queued in the store 35. The request eventually receives attention by the output port resource allocation unit 37 which serves to provide an appropriate acknowledgement signal via the lines 39 and 40 which serve to release the data from the store 4 at a rate determined in accordance with the bandwidth available.

It will be appreciated that by arranging for bandwidth requests to be queued as hereinbefore described, a more efficient system is provided with less possibility of delays.

Various modifications may be made to the arrangements before described without departing, from the scope of the present invention and, for example, any suitable buffer thresholding method and apparatus may be used. Furthermore, any number of input sources with appropriate stores will be provided in a practical example.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An ATM communication system comprising:
   an ATM switch having a plurality of input ports and a plurality of output ports, each of the input ports being fed from an input port server connected thereto and each of the output ports being arranged to feed an output port server connected thereto;
   each of the input port servers having a plurality of buffer stores wherein there is one respective buffer store for each of the output ports, data being transmitted through the ATM switch to said output ports; and
   each buffer store in the input port servers being arranged to interrogate a respective output port server with which said each buffer store communicates before transmission of data, thereby to determine whether output port server data handling capacity is available.

2. The system as claimed in claim 1, wherein interrogation of the output port servers is in the form of a bandwidth request signal from an input port server with regards to an associated buffer store, the request signal being directed to a respective output port server with which that associated buffer store communicates via the ATM switch, and wherein responsive to an acknowledgement signal from said respective output port server having available capacity, data is thereafter transmitted from the associated buffer store to the output port via the ATM switch.

3. The system as claimed in claim 2, wherein ATM data traffic is transmitted in frames, wherein each frame comprises a plurality of cells, an end of frame marker being transmitted in a final cell of the plurality of cells of each frame, the request signal being sent in the first cell of each frame.

4. The system as claimed in claim 3, wherein the request cell is arranged to request a bandwidth allotment which is based on mean frame size.

5. The system as claimed in claim 2, wherein the request signal is sent in dependence upon data stored from time to time in a respective buffer store.

6. The system as claimed in claim 5, wherein each buffer store has a plurality of data thresholds, request signals being transmitted in accordance with a respective threshold reached.

7. The ATM communication system as claimed in claim 1, wherein the system further comprises a queuing arrangement for bandwidth requests received during periods when there is no available bandwidth capacity, the queuing arrangement being such that requests are released in a predetermined order when capacity becomes available.

8. The system as claimed in claim 7, wherein an order of release is first to arrive, first to be processed.

9. The system as claimed in claim 7, wherein the system further comprises a priority releasing system for queued requests determined in dependence upon character of data appertaining to each queued request.

10. The system as claimed in claim 3, wherein the request signal is a cell following a cell which includes an end of frame marker.

11. The system as claimed in claim 3, wherein the mean frame size is the mean data capacity of a frame.

12. An ATM communication system comprising:
   an ATM switch having a plurality of input ports and a plurality of output ports, each of the input ports being fed from an input port server connected thereto and each of the output ports being arranged to feed an output port server connected thereto;
   each of the input port servers having a plurality of buffer stores, one respective buffer store for each of the output ports, data being transmitted through the ATM switch to said output ports;

with respect to each buffer store in the input port servers, means for interrogating a respective output port server with which said each buffer store communicates before transmission of data, thereby to determine whether output port server data handling capacity is available;

said means for interrogating providing a bandwidth request signal from an input port server with regards to an associated buffer store, the request signal being directed to an output port server with which that associated buffer store communicates via the ATM switch; and said output port server having available capacity providing an acknowledgement signal, in response to which acknowledgement signal, data is thereafter transmitted from the associated buffer store to the output port via the ATM switch.

13. The system as claimed in claim 12, wherein ATM data traffic is transmitted in frames, wherein each frame comprises a plurality of cells, an end of frame marker being transmitted in a final cell of the plurality of cells of each frame, the request signal being sent in the first cell of each frame.

14. The system as claimed in claim 12, wherein the request cell is arranged to request a bandwidth allotment which is based on mean frame size.

15. The system as claimed in claim 12, wherein the request signal is sent in dependence upon data stored from time to time in a respective buffer store.

16. The system as claimed in claim 15, wherein each buffer store has a plurality of data thresholds, request signals being transmitted in accordance with a respective threshold reached.

17. The ATM communication system as claimed in claim 12, wherein the system further comprises a queuing arrangement for bandwidth requests received during periods when there is no available bandwidth capacity, the queuing arrangement being such that requests are released in a predetermined order when capacity becomes available.

18. An ATM communication system comprising:
an ATM switch having a plurality of input ports and a plurality of output ports, each of the input ports being fed from an input port server connected thereto and each of the output ports being arranged to feed an output port server connected thereto;

each of the input port servers having a plurality of buffer stores, one respective buffer store for each of the output ports, data being transmitted through the ATM switch to said output ports;

with respect to each buffer store in the input port servers, means for interrogating a respective output port server with which said each buffer store communicates before transmission of data, thereby to determine whether output port server data handling capacity is available;

said means for interrogating providing a bandwidth request signal from an input port server with regards to an associated buffer store, the request signal being directed to an output port server with which that associated buffer store communicates via the ATM switch;

said output port server having available capacity providing an acknowledgement signal, in response to which acknowledgement signal, data is thereafter transmitted from the associated buffer store to the output port via the ATM switch; and a queuing arrangement for bandwidth requests received during periods when there is no available bandwidth capacity, the queuing arrangement being such that requests are released in a predetermined order when capacity becomes available.

19. The system as claimed in claim 18, wherein ATM data traffic is transmitted in frames, wherein each frame comprises a plurality of cells, an end of frame marker being transmitted in a final cell of the plurality of cells of each frame, the request signal being sent in the first cell of each frame, that is a cell following a cell which includes an end of frame marker; wherein the request cell is arranged to request a bandwidth allotment which is based on mean frame size, that is the mean data capacity of a frame.

20. The system as claimed in claim 18, wherein the request signal is sent in dependence upon data stored from time to time in a respective buffer store, each buffer store has a plurality of data thresholds, request signals being transmitted in accordance with a respective threshold reached, the system further comprises a priority releasing system for queued requests determined in dependence upon character of data appertaining to each queued request.

* * * * *